United States Patent
Wolf et al.

(10) Patent No.: US 9,768,653 B2
(45) Date of Patent: Sep. 19, 2017

(54) PROCESS FOR THE FORMATION OF A STACK OF SUPERPOSED METALLIC LAMINATIONS

(75) Inventors: Anderson Wolf, Joinville (BR); Andre Lucas Merini, Ascurra (BR); Hermann Otto Knupfer, Joinville (BR); Sergio Do Rosario, Joinville (BR); Tarcisio João Grott, Joinville (BR)

(73) Assignee: Whirlpool S. A., Sao Paulo-SP (BR)

(*) Notice: Subject to any disclaimer, the term of this patent is extended or adjusted under 35 U.S.C. 154(b) by 204 days.

(21) Appl. No.: 14/127,644

(22) PCT Filed: Jun. 22, 2012

(86) PCT No.: PCT/BR2012/000217
§ 371 (c)(1),
(2), (4) Date: Mar. 21, 2014

(87) PCT Pub. No.: WO2012/174629
PCT Pub. Date: Dec. 27, 2012

(65) Prior Publication Data
US 2014/0220297 A1   Aug. 7, 2014

(30) Foreign Application Priority Data
Jun. 22, 2011 (BR) .................................... 1102872

(51) Int. Cl.
*H01F 3/04*   (2006.01)
*H01F 7/06*   (2006.01)
(Continued)

(52) U.S. Cl.
CPC ............... *H02K 1/265* (2013.01); *H02K 1/06* (2013.01); *H02K 15/02* (2013.01); *H02K 15/024* (2013.01);
(Continued)

(58) Field of Classification Search
CPC ........ H02K 1/06; H02K 1/265; H02K 15/024; H02K 2201/09
(Continued)

(56) References Cited

U.S. PATENT DOCUMENTS 2,870,533 A * 1/1959 Benham ........................ 29/525
4,110,895 A * 9/1978 Mitsui ...................... H02K 1/26
29/564.2

(Continued)

FOREIGN PATENT DOCUMENTS

DE        3408563 A1    9/1985
EP        0847109 A2    6/1998
(Continued)

OTHER PUBLICATIONS

International Search Report dated Apr. 8, 2014, International Application No. PCT/BR2012/000217.

*Primary Examiner* — Paul D Kim
(74) *Attorney, Agent, or Firm* — Harrington & Smith

(57) ABSTRACT

Each lamination of the lamination stack comprises at least one assembly of coupling elements, said assembly comprising one insertion clamp, one receiving clamp and at least one receiving window, said coupling elements maintaining the same relative positioning from one another, the insertion clamp and the receiving clamp being defined by respective portions of the lamination axially projecting to the same side of the latter, each insertion clamp of a lamination being fitted, by interference, in the interior of a receiving clamp of an adjacent lamination, and each receiving clamp of a lamination being housed in the receiving window of at least one lamination of the stack.

5 Claims, 4 Drawing Sheets

(51) Int. Cl.
*H02K 1/26* (2006.01)
*H02K 15/02* (2006.01)
*H02K 1/06* (2006.01)

(52) U.S. Cl.
CPC ..... *H02K 2201/09* (2013.01); *Y10T 29/49009* (2015.01); *Y10T 428/24322* (2015.01)

(58) Field of Classification Search
USPC ........................ 29/602.1, 605–607; 451/5, 41
See application file for complete search history.

(56) References Cited

U.S. PATENT DOCUMENTS

| | | | | |
|---|---|---|---|---|
| 4,160,182 | A * | 7/1979 | Mitsui | 310/214 |
| 4,272,579 | A * | 6/1981 | Mitsui | H02K 1/26 |
| | | | | 29/521 |
| 4,912,350 | A * | 3/1990 | Parshall | H02K 1/16 |
| | | | | 310/216.013 |
| 4,979,285 | A * | 12/1990 | Martin | H02K 1/26 |
| | | | | 29/522.1 |
| 5,771,565 | A * | 6/1998 | Walters | H02K 1/12 |
| | | | | 29/564.2 |
| 5,923,112 | A * | 7/1999 | Bertocchi | H01F 3/02 |
| | | | | 29/596 |
| 6,223,417 | B1 * | 5/2001 | Saban | H02K 1/06 |
| | | | | 29/596 |
| 7,352,101 | B2 * | 4/2008 | Fujita | H02K 15/022 |
| | | | | 310/216.011 |
| 7,728,468 | B2 * | 6/2010 | Jeske | H02K 1/20 |
| | | | | 310/216.044 |
| 7,851,964 | B2 | 12/2010 | Negrello et al. | |
| 7,859,163 | B2 | 12/2010 | Bertocchi et al. | |
| 2006/0108891 | A1 | 5/2006 | Fujita | |

FOREIGN PATENT DOCUMENTS

| | | |
|---|---|---|
| EP | 1391975 A1 | 2/2004 |
| JP | S63213433 A | 9/1988 |
| JP | S63248528 A | 10/1988 |

* cited by examiner

PROCESS FOR THE FORMATION OF A STACK OF SUPERPOSED METALLIC LAMINATIONS

FIELD OF THE INVENTION

The present invention refers, in general terms, to a lamination stack, for example of the type used in a stator and/or rotor of electric motors, such as those used in refrigeration compressors. The invention further refers to a process for carrying out the assembly and mutual fixation of metallic laminations upon stacking a plurality of said metallic laminations to form the stack.

PRIOR ART

There are known from the prior art some solutions for fastening metallic laminations together to form the lamination stack of an electric motor.

In one of said known solutions, the metallic laminations that form the lamination stack are superposed and maintained in this position, by fitting, by interference, an insertion clamp (projection) produced in a lamination, into a receiving window (cavity) formed in an adjacent lamination, as disclosed in document EP0847109.

In this solution, a progressive tool cuts a plate, which will form the lamination, in several stages, until it presents all the desired lamination details. In the last stage, the metallic lamination is cut out from the rest of the plate, at each stroke of the press and deposited, with interference, in a matrix which defines the so-called lamination brake. In the following stroke, the tool cuts out other lamination to be deposited over the previous one. The previous lamination suffers the friction force of the brake and the cut out lamination is pushed by a device (punch) provided at the upper part of the tool, these forces thus making the projection of the cut out lamination penetrate, with interference, into the recess of the previous lamination.

One of the problems of the interference between the insertion clamp (projection) and the receiving window (cavity) is related to the mechanical characteristics of the material that forms the plate to be stamped. The insertion clamp is often crushed or deformed due to the interference and to the mechanical characteristics of the plate. Therefore, the insertion clamp is prevented from entering into the receiving window to fasten the lamination, as the latter is pushed upwardly.

To minimize such problems, the solution above requires fine tolerance in the production of metallic laminations, in order to form, when the latter are superposed, a lamination stack capable of maintaining a good rotational interlocking of its laminations.

Besides the tolerance requirement, said solution has the disadvantage of presenting a fragile axial locking stability of the lamination stack formed with the laminations constructed by said process, since said laminations do not provide a reliable mutual retention in the axial direction.

In other known solution (U.S. Pat. No. 7,859,163 and U.S. Pat. No. 7,851,964), the locking between the laminations of the lamination stack is made by the mutual interference between the insertion clamps (projections) formed, in each lamination, with the receiving clamps formed in other lamination, adjacent or not to the previous one. In the solutions which use "clamp on clamp", each clamp works, simultaneously, as a receiving clamp and as an insertion clamp, whereby said clamps are stamped in the same step, requiring rigid tolerances for the stamping tools and leading to an undesirably reduced useful life, increasing the cost of the productive process. The clamp-on-clamp fixation system requires accuracy for manufacturing, not only the clamps, but also the remaining parts of each lamination, leading to a complex production and to cost increase.

Besides the disadvantages mentioned above, the clamp-on-clamp clamping system allows frequent breaks to occur in the mutual locking elements of the laminations, due to the fact that it requires the fitting, by interference, of the clamps presenting the same dimensions.

OBJECTS OF THE INVENTION

It is an object of the present invention to provide a metallic lamination, to be placed over other metallic lamination, upon the formation of a lamination stack, which allows said laminations to be safely and reliably mounted and axially and rotationally fastened together, by means of a clamp-on-clamp locking, without increasing the thickness of the lamination stack to be formed, and which requires precision of the dimensional tolerances only for the surfaces of the mutually cooperating insertion clamps and receiving clamps, upon fastening each two adjacent laminations.

It is another object of the present invention to provide a lamination stack which can be formed within a desired pattern of metallic lamination of the type defined above. It is a further object of the invention to provide a metallic lamination and a stack of metallic laminations, as mentioned above, which can be obtained without impairing, in the manufacturing process thereof, the operating speed of the tools employed, and without increasing the manufacturing cost of the laminations and lamination stack.

It is an additional object of the invention to provide a lamination stack as defined above, which can be repeatedly obtained within the desired pattern, even when batches of different materials are used.

It is still a further object of the invention to provide a process for producing the lamination stack, which minimizes the different mechanical characteristics (one of the existing problems), allowing to interconnect laminations made of different materials.

SUMMARY OF THE INVENTION

These and other objects are achieved through a stack of metallic laminations comprising a plurality of superposed laminations, each lamination comprising at least one assembly of coupling elements which includes one insertion clamp, one receiving clamp, and at least one receiving window, said coupling elements maintaining the same relative positioning from one another, the insertion clamp and the receiving clamp being defined by respective portions of the lamination axially projecting to the same side of the latter, each insertion clamp of a lamination being fitted, by interference, in the interior of a receiving clamp of an adjacent lamination, and each receiving clamp of a lamination being housed in the receiving window of at least one lamination of the stack. The present invention further provides a lamination, formed of a metal piece, comprising at least one assembly of coupling elements, as defined above.

The lamination stack of the present invention is obtained through a process comprising the steps of: a—producing a first metallic lamination comprising at least one assembly of coupling elements, as defined above; b—conducting the first lamination produced to a support matrix; c—producing a second lamination, as defined in step "a"; d—displacing the support matrix with the first lamination, in order to align, axially, the receiving clamp and the insertion clamp of the second lamination with the receiving window and with the receiving clamp, respectively, of the first lamination; e—conducting the second lamination to the support matrix, pressing it against the first lamination, in order to house the receiving clamp of the second lamination in the receiving window of the first lamination and to fit, by interference, the insertion clamp of the second lamination into the receiving clamp of the first lamination; f—producing a third lamination, as defined in step "a" and "c"; g—displacing the support matrix with the first and the second lamination, in order to align, axially, the receiving clamp and the insertion clamp of the third lamination with the receiving window and with the receiving clamp, respectively, of the second lamination; h—conducting the third lamination to the support matrix, pressing it against the second lamination, in order to house the receiving clamp of the third lamination in the receiving window of the second lamination and to fit, by interference, the insertion clamp of the third lamination into the receiving clamp of the second lamination; and i—repeating the steps from "c" to "h", until finishing the stacking of the laminations that define the lamination stack.

The invention further allows the lamination stack to be formed by laminations comprising at least one assembly of coupling elements which include, besides the already defined insertion and receiving clamps and receiving window, a second receiving window. In this variant of the invention, each receiving clamp of a lamination is placed through the second receiving window of the immediately adjacent lamination, and housed in the interior of the first window of the lamination subsequent to said immediately adjacent lamination.

The solution proposed herein allows obtaining a reliable and efficient axial and rotational locking between laminations of a single pattern, without requiring complex and accurate tools for stamping the insertion and the receiving clamps.

The process for forming the lamination stack of the present invention allows said lamination stack to be obtained without impairing, in the manufacturing process thereof, the operating speed of the tools employed, and without increasing the manufacturing cost of the laminations and of the lamination stack.

BRIEF DESCRIPTION OF THE DRAWINGS

These and other objects and advantages of the present invention will become more evident, making references to the appended drawings, by way of example of the embodiments of the invention, and in which.

DETAILED DESCRIPTION OF THE INVENTION

Figure 1:
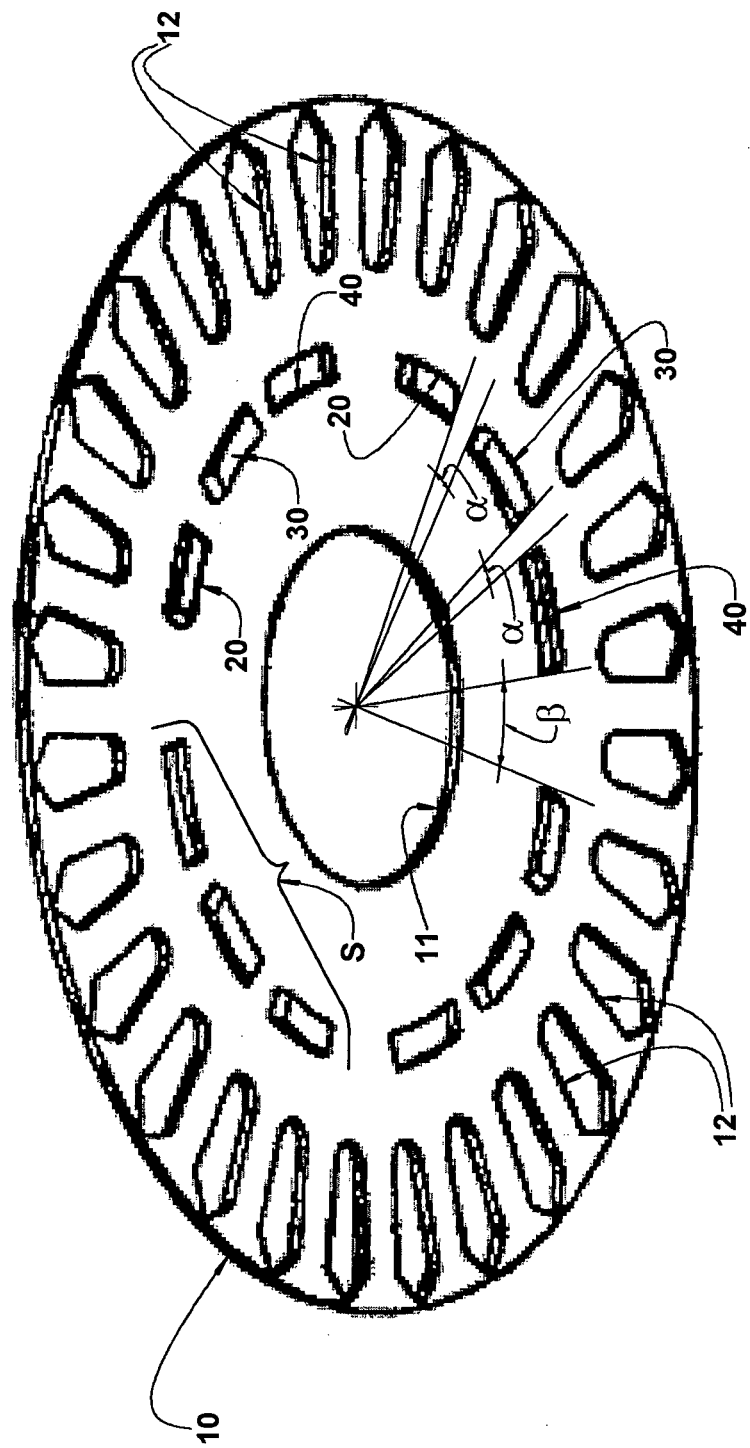
FIG. 1 represents a lower perspective view of a metallic lamination constructed according to the present invention.

While the description below is related to metallic laminations 10 in the form of circular discs, to be applied in the formation of a lamination stack, for example of an electric motor, it should be understood that the invention can be applied to fasten two or more laminations to each other, for different applications.

As illustrated in the drawings, the laminations 10 present a central hole 11 which is usually obtained by stamping a metallic plate 1 in a stamping unit 2 provided with a stamping punch 3 and with a support matrix 4 for the already formed laminations 10 and in which the laminations 10 are progressively stacked and locked to each other.

The lamination stack of the present invention comprises a plurality of superposed metallic laminations 10, each lamination 10 comprising at least one assembly S of coupling elements, said assembly S comprising one insertion clamp 20, one receiving clamp 30 and at least one receiving window 40.

The insertion clamp 20 and the receiving clamp 30 are defined by respective portions of the lamination 10 axially projecting to the same side of the latter, each insertion clamp 20 of a lamination 10 being fitted, by interference, in the interior of a receiving clamp 30 of an adjacent lamination 10, and each receiving clamp 30 of a lamination 10 being housed in the receiving window 40 of at least one lamination 10 of the stack.

In the illustrated constructive form, the lamination 10 has its contour obtained by a cutting process, whereas the insertion clamp 20 and the receiving clamp 30 are obtained by the process of cutting and drawing the respective portions of the lamination 10. The insertion clamp 20 presents a similar shape, being inscribed in the inner contour of the receiving clamp 30. The receiving window 40 is obtained by the cutting process.

In the construction illustrated in FIGS. 1 to 3 and 4, the insertion clamps 20 and the receiving clamps 30 are defined by respective portions of the lamination axially projecting to the same side of the latter, by an extension at maximum equal to the thickness of each one of the laminations 10 of the stack.

In the constructive form exemplified in FIGS. 1 to 3 and 4, the receiving clamp 30 of a lamination 10 is housed, without interference, in the interior of a receiving window 40 of an immediately adjacent lamination 10, occupying the thickness of the latter, whereas the insertion clamp 20, fitted in said receiving clamp 30, occupies the thickness of the lamination that carries the receiving clamp 30.

According to a constructive form, illustrated in FIGS. 1 to 3 and 4, each assembly S of coupling elements comprises, besides the insertion clamp 20 and the receiving clamp 30, a receiving window 40, disposed as already defined for the coupling elements of the assembly S.

In said construction, there are illustrated three superposed laminations 10 from the first to a third upper superior lamination 10. In this embodiment, the second lamination 10 has: its receiving clamp 30 housed in the receiving window 40 of the first lamination 10; and its insertion clamp 20 fitted, by interference, in the receiving clamp 30 of the first lamination 10.

The third lamination 10 has: its receiving clamp 30 housed in the receiving window 40 of the second lamination 10; and its insertion clamp 20 fitted, by interference, in the receiving clamp 30 of the second lamination 10, and so successively, for the subsequent laminations of the stack.

Figure 3:
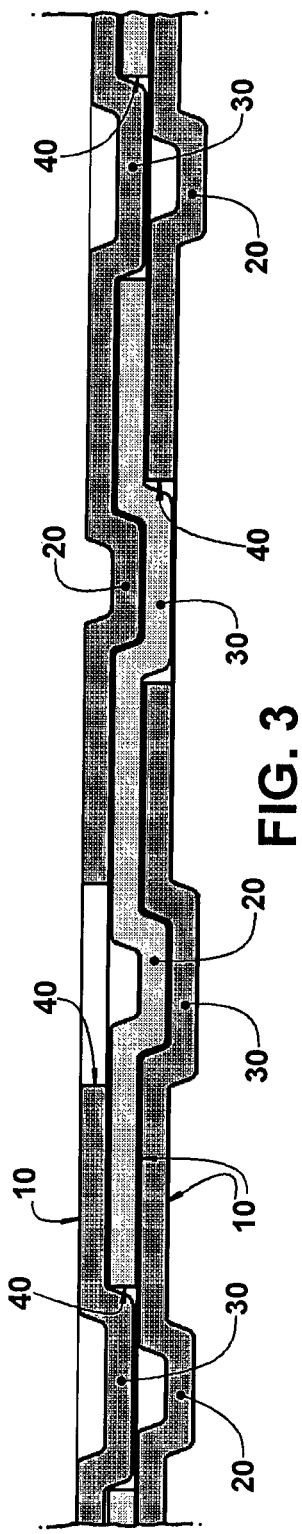
FIG. 3 represents a schematic view of part of a stack with three stacked laminations, illustrating, in a sectional view, the relative positioning between an insertion clamp of one of the laminations in relation to the receiving clamp of other adjacent lamination, and between said receiving clamp and the receiving window of a third lamination of the illustrated stack.
Figure 3A:
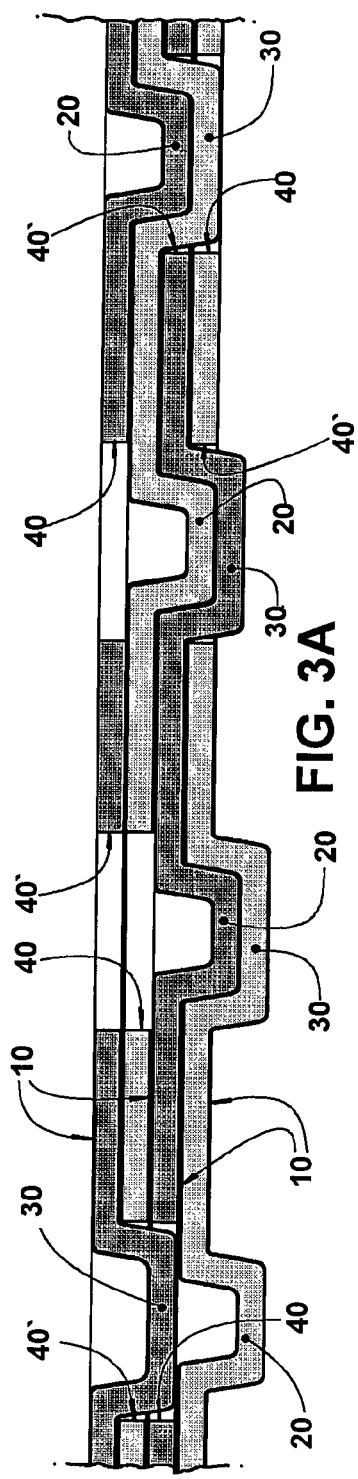
FIG. 3A represents a schematic view of part of a stack with four stacked laminations, illustrating, in a sectional view, the relative positioning between an insertion clamp of one of the laminations in relation to the receiving clamp of another adjacent lamination, and between said receiving clamp and the receiving windows of a third and a fourth lamination of the stack, according to a constructive variant in which each assembly of coupling elements includes two receiving windows.

According to other constructive form, illustrated only in FIG. 3A, each assembly S of coupling elements comprises, besides the insertion clamp 20 and the receiving clamp 30, a first receiving window 40 and a second receiving window 40', which are arranged according to the same characteristics already defined for the coupling elements of the assembly S.

Nevertheless, in said constructive variant, there are illustrated four superposed laminations 10, from the first to a fourth upper lamination 10. In said variant, the second lamination 10 has: its second receiving window 40' aligned with the first window 40 of the first lamination 10; its receiving clamp 30 housed in the second receiving window 40' of the first lamination 10; and its insertion clamp 20 fitted, by interference, in the receiving clamp 30 of the first lamination 10.

The third lamination 10 has: its second receiving window 40' aligned with the first receiving window 40 of the second lamination 10; its receiving clamp 30 housed through the second receiving window 40' of the second lamination 10 and in the interior of the first window 40 of the first lamination 10; and its insertion clamp 20 fitted, by interference, in the receiving clamp 30 of the second lamination 10, and so successively, for the fourth lamination 10 and for the subsequent laminations of the stack.

In the constructive variant cited above, the receiving clamp 30 is housed, with no mechanical interference, in the interior of the receiving windows 40, 40' of two adjacent and consecutive laminations 10.

Although the figures indicate the provision of four assemblies S of coupling elements in each lamination 10, it should be understood that each lamination 10 can be provided with a single assembly S, with its coupling elements being angularly and equally spaced from each other. It is also possible to provide more assemblies S of coupling elements, with the coupling elements of the same type, of the different assemblies, being grouped in subassemblies which are angularly spaced from the other subassemblies of the other types of coupling elements. Thus, the insertion clamps 20 of the different assemblies S of coupling elements may be grouped in a subassembly and slightly spaced from one another, whereas the receiving clamps 30 and the receiving windows 40 will also be grouped in respective subassemblies of coupling elements of the same type.

Regardless of the number of assemblies S of coupling elements and of the way by which the latter are arranged in each lamination, it should be noted that the coupling elements should maintain the same relative positioning from one another.

In the illustrated constructions, directed to the formation of the laminations of a lamination stack of a stator or of a rotor of an electric motor, the coupling elements of a lamination 10 are arranged in a circumferential alignment, equally spaced from each other by the same angular distance $\alpha$.

The receiving window 40 in an assembly S of coupling elements takes the form of a through opening dimensioned to receive, generally without mechanical interference, a receiving clamp 30 of a lamination 10 immediately adjacent to that provided with the receiving window 40, as illustrated in the embodiment represented in FIG. 3, or the receiving clamp 30 of a lamination 10 subsequent to that one immediately adjacent, as illustrated in FIG. 3A.

Figure 4:
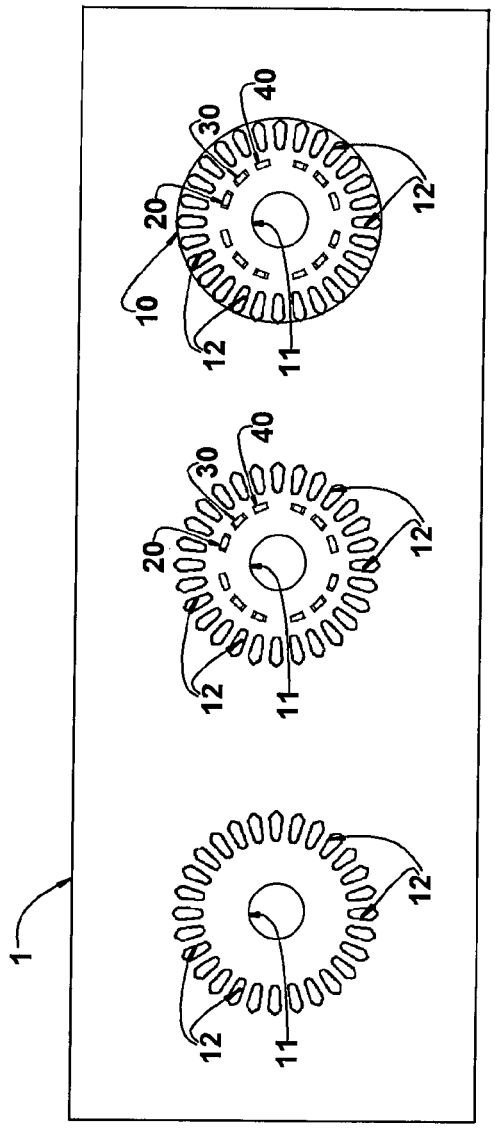
FIG. 4 represents, schematically, an upper plan view of a metallic plate in different phases of obtaining a lamination stack, according to the present invention, said different phases being indicated by the references I to IV.

In the illustrated construction, the assemblies S of coupling elements of each lamination 10 are spaced from each other by the same angular distance $\beta$, it being understood that the four assemblies S illustrated in FIGS. 1 and 4 may be provided in a higher or lower number, depending on the dimensional characteristics of the lamination stack to be formed.

Although the insertion clamps 20 and the receiving clamps 30 are usually defined by respective portions of the lamination 10 which are formed by a cutting and drawing process, said clamps can be formed by other stamping methods, with or without cutting the respective portion of the lamination 10, provided that they can interact by mutual interference, upon the fixation of each two adjacent laminations, as described ahead.

In the illustrated constructive example, the insertion clamps 20 present a similar substantially frusto-pyramidal shape and can be fitted, by interference, in the interior of the receiving clamp 30.

The constructions for the lamination 10 defined above allow said laminations to be stacked in a plurality of laminations mutually seated to each other, without the formation of axial gaps therebetween.

The construction proposed herein allows that each two adjacent laminations be seated completely one against the other, and thus axially and rotationally locked together, by the interference fit of the insertion clamps 20 of one of them in respective receiving clamps 30 of the other, whereas said receiving clamps 30 are received in the interior of respective receiving windows 40, 40' of other laminations 10. As already mentioned, the axial projection of the insertion clamps 20 and of the receiving clamps 30 in relation to the adjacent face of the lamination 10 is limited to the value of the thickness of the laminations 10 utilized in the formation of the stack, in the construction illustrated in the FIG. 3. Therefore, the receiving clamps 30 can be housed in the interior of the thickness of a respective receiving window 40 of an adjacent lamination 10, preventing said clamps from forcing the adjacent laminations 10 outward from a desired and necessary mutual seating in the whole area of the confronting faces of each two adjacent laminations 10.

As already mentioned, in the constructive variant of FIG. 3A, the axial projection of the insertion clamps 20 and of the receiving clamps 30, in relation to the adjacent face of the lamination 10, is limited to the value of the thickness of two laminations 10 used in the formation of the stack.

In the locking system proposed herein, the insertion clamps 20 should be shaped so that the projecting external surfaces thereof present the dimensions adequate to be fitted, by mechanical interference, in the interior of each respective receiving clamp 30. Thus, said receiving clamps 30 only require their internal surfaces to be adequately shaped to receive and retain the insertion clamps 20.

The other surfaces of the insertion clamps 20 and of the receiving clamps 30 do not require to be shaped with rigid tolerances, making less complex the formation and maintenance of the stamping tools. Each type of clamp has only one specific function of insertion or of reception.

Considering the illustrated embodiments, it can be understood that each lamination 10 is preferably provided with at least two assemblies S of coupling elements, each one of said assemblies S comprising, sequentially, one insertion clamp 20, one receiving clamp 30, and at least one receiving window 40, said assemblies S being spaced from each other by the same angular distance β.

Considering the application of the lamination stack in the formation of the stator or of the rotor of an electric motor, the circumferential alignment of the coupling elements of an assembly S of the laminations 10 is median and concentric to the contour of the latter.

The lamination stack of the present invention, according to an embodiment of FIGS. 1 to 3 and 4, is obtained with a process presenting, generically, the steps of:

a—producing a first metallic lamination 10 comprising at least one assembly S of coupling elements, including one insertion clamp 20, one receiving clamp 30 and one receiving window 40, said coupling elements maintaining the same relative positioning from one another, the insertion clamp 20 and the receiving clamp 30 being defined by respective portions of the lamination 10 axially projecting to the same side of the latter;

b—conducting the first lamination 10 produced to a support matrix 4;

c—producing a second lamination 10, as defined in step "a" for the production of the first lamination 10;

d—displacing the support matrix 4 with the first lamination 10, in order to align, axially, the receiving clamp 30 and the insertion clamp 20 of the second lamination 10 with the receiving window 40 and with the receiving clamp 30, respectively, of the first lamination 10;

e—conducting the second lamination 10 to the support matrix 4, pressing it against the first lamination 10, in order to house the receiving clamp 30 of the second lamination 10 in the receiving window 40 of the first lamination 10 and to fit, by interference, the insertion clamp 20 of the second lamination 10 in the receiving clamp 30 of the first lamination 10;

f—producing a third lamination 10, as defined in step "a" e "c";

g—displacing the support matrix 4 with the first and the second lamination 10, in order to align, axially, the receiving clamp 30 and the insertion clamp 20 of the third lamination 10 with the receiving window 40 and with the receiving clamp 30, respectively, of the second lamination 10;

h—conducting the third lamination 10 to the support matrix 4, pressing it against the second lamination 10, in order to house the receiving clamp 30 of the third lamination 10 in the receiving window 40 of the second lamination 10 and to fit, by interference, the insertion clamp 20 of the third lamination 10 in the receiving clamp 30 of the second lamination 10; and i—repeating the steps from "c" to "h", until finishing the stacking of the laminations 10 that define the lamination stack.

Considering the form of a circular disc of the laminations 10 and also the circumferential alignment of the coupling elements, the support matrix 4 is displaced, angularly, before receiving a lamination 10, subsequent to each lamination 10 supplied thereon.

The lamination stack of the present invention, according to the embodiment of FIG. 3A, is obtained with a process presenting, generically, the steps of:

a—producing a first metallic lamination 10 comprising at least one assembly S of coupling elements, including one insertion clamp 20, one receiving clamp 30 and two receiving windows 40, said coupling elements maintaining the same relative positioning from one another, the insertion clamp 20 and the receiving clamp 30 being defined by respective portions of lamination 10 axially projecting to the same side of the latter;

b—conducting the first lamination 10 produced to a support matrix 4;

c—producing a second lamination 10, as defined in step "a" for the production of the first lamination 10;

d—displacing the support matrix 4 with the first lamination 10, in order to align, axially, a second receiving window 40', the receiving clamp 30 and the insertion clamp 20 of the second lamination 10 with a first receiving window 40, with the second receiving window 40' and with the receiving clamp 30, respectively, of the first lamination 10;

e—conducting the second lamination 10 to the support matrix 4, pressing it against the first lamination 10, in order to house the receiving clamp 30 of the second lamination 10 in the second receiving window 40' of the first lamination 10 and to fit, by interference, the insertion clamp 20 of the second lamination 10 in the receiving clamp 30 of the first lamination 10;

f—producing a third lamination 10, as defined in steps "a" and "c";

g—displacing the support matrix 4 with the first and the second lamination 10, in order to align, axially, the second receiving window 40', the receiving clamp 30 and the insertion clamp 20 of the third lamination 10 with the first receiving window 40, with the second receiving window 40' and with the receiving clamp 30, respectively, of the second lamination 10;

h—conducting the third lamination 10 to the support matrix 4, pressing it against the second lamination 10, in order to house the receiving clamp 30 of the third lamination 10 through the second receiving window 40' of the second lamination 10 and in the interior of the first window 40 of the first lamination 10 and to fit, by interference, the insertion clamp 20 of the third lamination 10, in the receiving clamp 30 of the second lamination 10; and i—repeating the steps from "c" to "h", until finishing the stacking of the laminations 10 which define the lamination stack.

Figure 2:
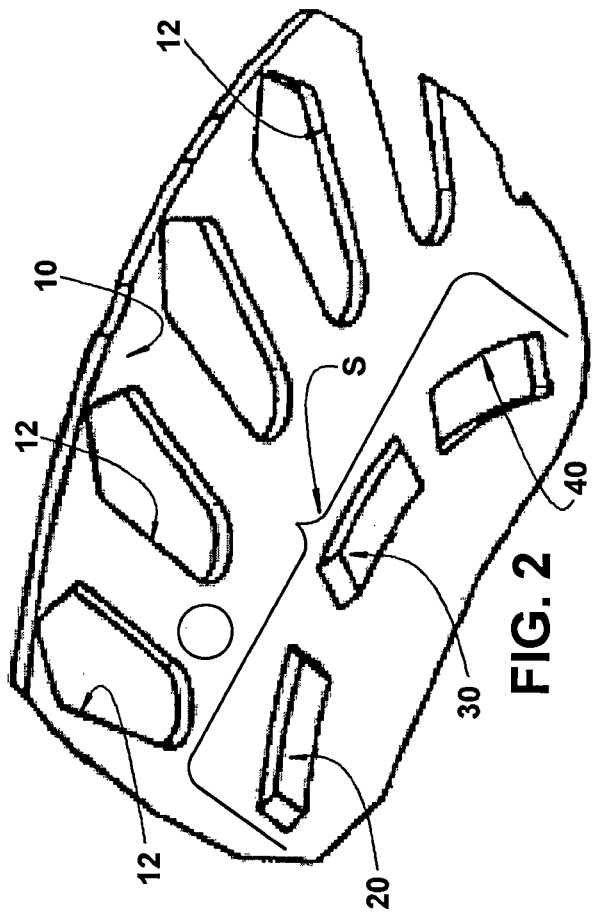
FIG. 2 represents an enlarged perspective view of a portion of the lamination illustrated in FIG. 1, showing one of the assemblies of the coupling elements.

FIG. 4 illustrates a lamination 10 constructed according to FIGS. 1 to 3, being obtained from a metallic plate 1 in which are stamped, for example, a plurality of openings 12, which are designed to provide, in the case of forming the lamination stack, housings to be filled with aluminum for the formation of the rotor cage.

After producing the insertion clamps 20, the receiving clamps 30, the receiving windows 40 and the openings 12 and the central hole 11, in the region of the metallic plate 1 that forms the lamination 10, the latter is cut out from the metallic plate 1 and conducted to the support matrix 4. FIG. 4 illustrates, in a simplified and somewhat schematic manner, only one example of the process for the formation of the laminations 10.

According to the example illustrated in FIG. 4, a metallic plate 1 is fed to a stamping unit 2 and submitted, in a first phase of the stamping process, to the production of the aluminum cage of the rotor to be obtained with the lamination stack, said openings 12 being arranged according to a circular alignment concentric to the central hole 11 and close to the peripheral circular contour of the lamination 10 to be formed.

In a phase subsequent to that of obtaining the central hole 11 and the openings 12, the metallic sheet 1 can be submitted to the stamping of the assemblies S of coupling elements, which are defined by the insertion clamps 20, receiving clamps 30a and by one or two receiving windows 40, 40', all arranged according to a circular alignment which is concentric and intermediary to the central hole 11 and to the circular alignment of the openings 12.

Figure 5:
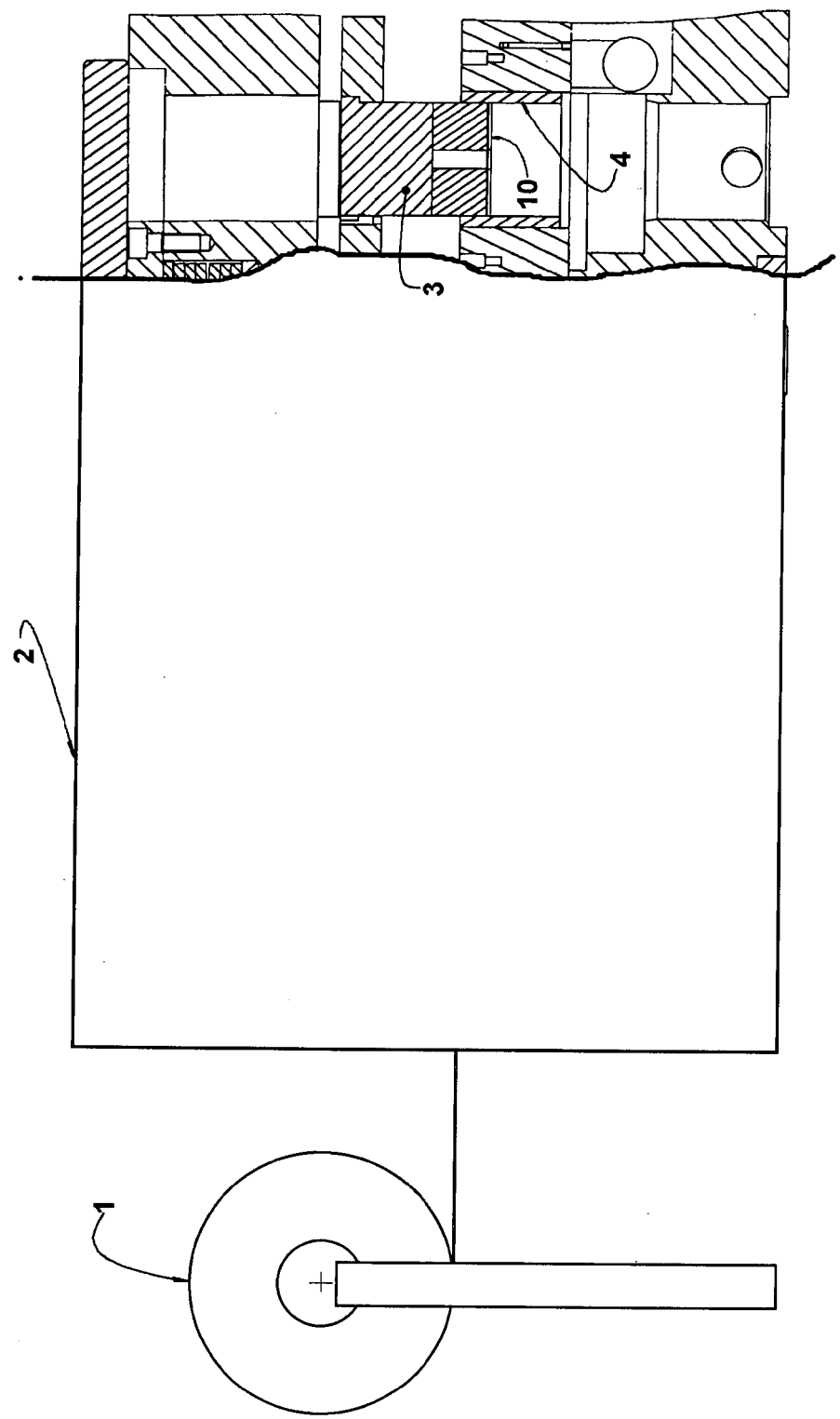
FIG. 5 represents, schematically, a partially cut lateral view of a lamination stamping station, illustrating, in a lamination stacking station, a first lamination for the formation of the lamination stack.

In the following phase, it is carried out the cutting of the external contour of the lamination 10, and then said lamination 10, already separated from the metallic sheet 1, is conducted to the support matrix 4, or brake-matrix (FIG. 5).

The insertion clamps 20 and/or the receiving clamps 30 can be obtained, for example, by the cutting or deformation of the respective portion of the lamination 10, or by deformation only, without rupturing the metallic plate 1, as described before.

Each stamped lamination 10 is conducted to the support matrix 4 by the punch 3, it being noted that, upon receiving a lamination 10, the support matrix 4 submits the lamination 10 to a displacement which, in the exemplified specific application, takes the form of a rotation around the central axis of said lamination 10, before seating, on the latter, another lamination 10 formed of and separated from the metallic plate 1, according to the stamping phases commented above. The rotation of the laminations 10, already positioned on the support matrix 4, should be such as to allow the correct axial alignment between the coupling elements of the last lamination 10 received on the support matrix 4 and the coupling elements of the new lamination 10 to be received on the support matrix 4 after being detached from the metallic plate 1.

The rotation angle of the support matrix 4 is a function of the number and distribution of the assemblies S of coupling elements.

The seating of each lamination 10 on a lamination 10 already disposed on the support matrix 4, in an option of the present invention, is carried out by the punch 3, which also provokes the forced insertion, with mechanical interference, of the insertion clamps 20 of the incoming lamination 10, in the receiving clamps 30 of the lamination 10 previously seated and locked to the lamination stack being formed.

In a way of carrying out the present invention, the laminations 10 of the lamination stack present the same assemblies S of coupling elements. In another constructive option, only the last lamination of the lamination stack differs from the previous ones, said last lamination being a separation lamination, not illustrated, preferably provided only with receiving windows and receiving clamps.

The solution of the present invention provides a lamination stack, whose laminations are rotatively and axially locked to one another, at each two adjacent laminations, resulting in a stack which is less fragile than those stacks of the known prior art discussed herein, and which is more rapidly produced, the process for the formation of said laminations requiring fewer steps than the processes for obtaining the laminations of the known constructions, without requiring the same degree of precision of the tools used.

Alternative embodiments will be understood as possible by those skilled in the art and should be considered as included in the scope of the claims. Thus, the description above should be understood as illustrative, not limiting the invention. All obvious alterations and modifications are within the scope of the appended claims.

The invention claimed is:

1. A process for the formation of a stack of superposed metallic laminations, characterized in that it comprises the steps of:
   a—producing a first metallic lamination comprising at least one assembly of coupling elements, including one insertion clamp, one receiving clamp and one receiving window, said coupling elements maintaining the same relative positioning from one another, the insertion clamp and the receiving clamp having an axial projection disposed on a first surface of the first metallic lamination so as to define a recess on a second surface of the first metallic lamination, the second surface being opposite the first surface, and wherein the recess of the receiving clamp is wider than the recess of the insertion clamp, and wherein the recess of the receiving clamp is configured to receive the axial projection of the insertion clamp;
   b—conducting the first lamination produced to a support matrix, wherein upon receiving a lamination, the support matrix submits the lamination to a displacement which takes the form of a rotation around the central axis of said lamination in order to allow the correct axial alignment between the coupling elements of a last lamination received on the support matrix and the coupling elements of the next lamination to be received on the support matrix after being detached from the metallic plate;
   c—producing a second lamination, as defined in step "a" for the production of the first lamination;
   d—displacing the support matrix with the first lamination, in order to align, axially, the receiving clamp and the insertion clamp of the second lamination with the receiving window and with the receiving clamp, respectively, of the first lamination;
   e—conducting the second lamination to the support matrix, pressing the second lamination against the first lamination, in order to house the receiving clamp of the second lamination in the receiving window of the first lamination and to fit, by interference, the insertion clamp of the second lamination, in the receiving clamp of the first lamination;
   f—producing a third lamination, as defined in step "a" to "c";
   g—displacing the support matrix with the first and the second lamination in order to align, axially, the receiving clamp and the insertion clamp of the third lamination with the receiving window and with the receiving clamp, respectively, of the second lamination;
   h—conducting the third lamination to the support matrix, pressing the third lamination against the second lamination, in order to house the receiving clamp of the third lamination in the receiving window of the second lamination and to fit, by interference, the insertion clamp of the third lamination in the receiving clamp of the second lamination; and
   i—repeating the steps from "c" to "h", until finishing the stacking of the laminations that define the lamination stack.

2. The process, according to claim 1, characterized in that the insertion clamp and the receiving clamp are defined by respective portions of the first lamination, second lamination and third lamination formed by cutting and drawing the latter, the insertion clamp presenting a similar shape inscribed in an inner contour of the receiving clamp.

3. The process, according to claim 1, characterized in that the coupling elements of the at least one assembly are arranged within the same circumferential alignment and equally spaced from each other by the same angular distance, the support matrix being angularly displaced before receiving the second lamination subsequent to the first lamination.

4. The process, according to claim 3, characterized in that the each lamination is provided with at least two assemblies of coupling elements, each of said assemblies comprising, sequentially, one insertion clamp, one receiving clamp and one receiving window, said assemblies being spaced from one another by the same angular distance.

5. The process, according to claim 3 and to be used in the formation of a stator or a rotor of an electric motor, characterized in that the circumferential alignment of the coupling elements is median and concentric to the contour of the lamination.

* * * * *